(12) United States Patent
Vrsek et al.

(10) Patent No.: US 7,815,533 B2
(45) Date of Patent: Oct. 19, 2010

(54) CAMSHAFT DRIVE SYSTEM FOR INTERNAL COMBUSTION ENGINE

(75) Inventors: Gary A. Vrsek, Howell, MI (US); Michael Magnan, Dearborn, MI (US); Kim Ku, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 770 days.

(21) Appl. No.: 11/532,623

(22) Filed: Sep. 18, 2006

(65) Prior Publication Data

US 2008/0070731 A1  Mar. 20, 2008

(51) Int. Cl.
*F16H 7/08* (2006.01)
*F16H 7/12* (2006.01)

(52) U.S. Cl. .................. 474/111; 474/110; 474/109; 474/134

(58) Field of Classification Search ............ 474/111, 474/110, 109, 134
See application file for complete search history.

(56) References Cited

U.S. PATENT DOCUMENTS

| | | | |
|---|---|---|---|
| 1,581,624 A | 4/1926 | Wunderlich et al. | |
| 1,892,067 A | 12/1932 | McMillan | |
| 2,185,079 A * | 12/1939 | Hall | 474/87 |
| 2,210,276 A * | 8/1940 | Bremer | 474/110 |
| 2,945,393 A * | 7/1960 | Paulson | 477/7 |
| 4,576,127 A | 3/1986 | Doi et al. | |
| 5,109,813 A | 5/1992 | Trzmiel et al. | |
| 5,323,739 A | 6/1994 | Mollers | |
| 5,457,967 A * | 10/1995 | Scherzinger | 66/151 |
| 5,961,358 A * | 10/1999 | Hardesty et al. | 440/75 |
| 6,358,169 B1 | 3/2002 | Markley | |
| 7,033,295 B2 * | 4/2006 | Garbagnati et al. | 474/110 |
| 2004/0043854 A1 * | 3/2004 | Fraley et al. | 474/134 |

FOREIGN PATENT DOCUMENTS

| | | |
|---|---|---|
| CH | 269892 | 7/1950 |
| DE | 3318093 | 11/1984 |
| DE | 3904696 | 10/1989 |
| DE | 3933878 | 5/1990 |

* cited by examiner

*Primary Examiner*—Bradley T King
*Assistant Examiner*—Mahbubur Rashid
(74) *Attorney, Agent, or Firm*—Jerome R. Drouillard; Julia Voutyras

(57) ABSTRACT

A camshaft drive system for an internal combustion engine includes a drive sprocket fixed upon a crankshaft of the engine and a driven sprocket fixed upon a camshaft of the engine. A flexible power transmission element extends between the drive sprocket and driven sprocket. A tensioning device for the flexible power transmission element includes a linear actuator and a number of movable contactors for engaging and tensioning both the slack side and the tight side of the power transmission element, such that proper phasing of the camshaft with respect to the crankshaft is maintained.

6 Claims, 5 Drawing Sheets

CAMSHAFT DRIVE SYSTEM FOR INTERNAL COMBUSTION ENGINE

BACKGROUND OF THE INVENTION

1. Field of the Invention

The present invention is related to a mechanism for powering a cylinder poppet valve operating camshaft of an internal combustion engine with a flexible power transmission member driven by the engine's crankshaft.

2. Disclosure Information

Internal combustion engine camshafts have typically been driven either by a gear train, as in heavy duty engines, such as certain diesel engines, or by flexible transmission members such as chains or belts, typically used in gasoline engines and medium duty diesel engines. Gear drives provide the most precise control over the position of the camshaft throughout the engine's useful life. However, gear drives are expensive and generate much more noise than chain or belt drives. On the other hand, although chain and belt drives are less expensive than gear drives, the inevitable wear of chains and belts has caused problems at high mileage with certain engines because mispositioning of the camshaft, as will occur where a tensioner for the chain or belt is applied at only one side of the chain or belt, typically the slack side, will cause phasing of the camshaft with respect to the engine's crankshaft to be changed as the chain or belt wears. This is undesirable for reasons of performance, emissions, fuel economy, and sometimes and, ultimately, engine life in the case of certain engines, wherein a lack of free-wheeling construction means that excessive loss of phase control of the camshaft results in catastrophic destruction of the engine because the pistons of the engine contact the valves at top dead center.

A camshaft drive system according to the present invention provides accurate control of the camshaft phasing, in the context of a less expensive belt or chain system, using hardware which is available at a reasonable cost.

SUMMARY OF THE INVENTION

A camshaft drive system for an internal combustion engine includes a drive sprocket fixed upon a crankshaft of the engine, and a driven sprocket fixed upon a camshaft of the engine. A flexible power transmission element extends between the drive sprocket and the driven sprocket. The flexible power transmission element has a slack side and a tight side. A tensioning device includes a linear actuator having an axis of operation which is parallel to a line extending from the center of the drive sprocket to the center of the driven sprocket. A number of movable contactors for engaging, and thereby tensioning, the slack side and the tight side of the flexible power transmission element are operably connected with, and movable by, the linear actuator such that movement of the linear actuator in a selected direction along its axis of operation will cause the slack side and the tight side of the flexible power transmission element to be displaced, and thereby tightened, equally.

A linear actuator useful for incorporation in the present system preferably includes a spring-loaded plunger which is mounted within a cylinder furnished with a supply of oil under pressure from an engine lubrication system such that force exerted by the spring and the oil upon the plunger combine to urge the contactors, which may be either rollers or guide shoes, in a direction tending to tighten the flexible power transmission element equally on both the tight and slack sides.

According to another aspect of the present invention, the present camshaft drive system may further include a number of stationary contactors rigidly mounted adjacent to the flexible power transmission element, whether it be a chain or a belt, with at least one of the stationary contactors bearing upon the slack side of the power transmission and another one of the stationary contactors bearing upon the tight side of the power transmission element, such that the travel of the movable contactors needed to remove slack from the power transmission element is reduced.

According to another aspect of the present invention, a movable contactor incorporated in the present camshaft drive system may be moved either slidingly in the same direction of movement as the direction of movement of the linear actuator, or, alternatively, the contactors may be moved laterally inward in response to movement of the linear actuator. As yet another alternative, the movable contactors may be rotated in response to movement of the linear actuator.

It is an advantage of a camshaft drive system according to the present invention that precise control of the camshaft phasing is maintained throughout the useful life of an engine.

It is another advantage of a camshaft drive system according to the present invention that the present system is quieter than known gear drive systems.

It is yet another advantage of the present camshaft drive system that the present system may be employed at less cost than known camshaft drive systems achieving accurate control of camshaft phasing.

Other advantages, as well as features and objects of the present invention, will become apparent to the reader of this specification.

DETAILED DESCRIPTION OF THE PREFERRED EMBODIMENTS

Figure 1:
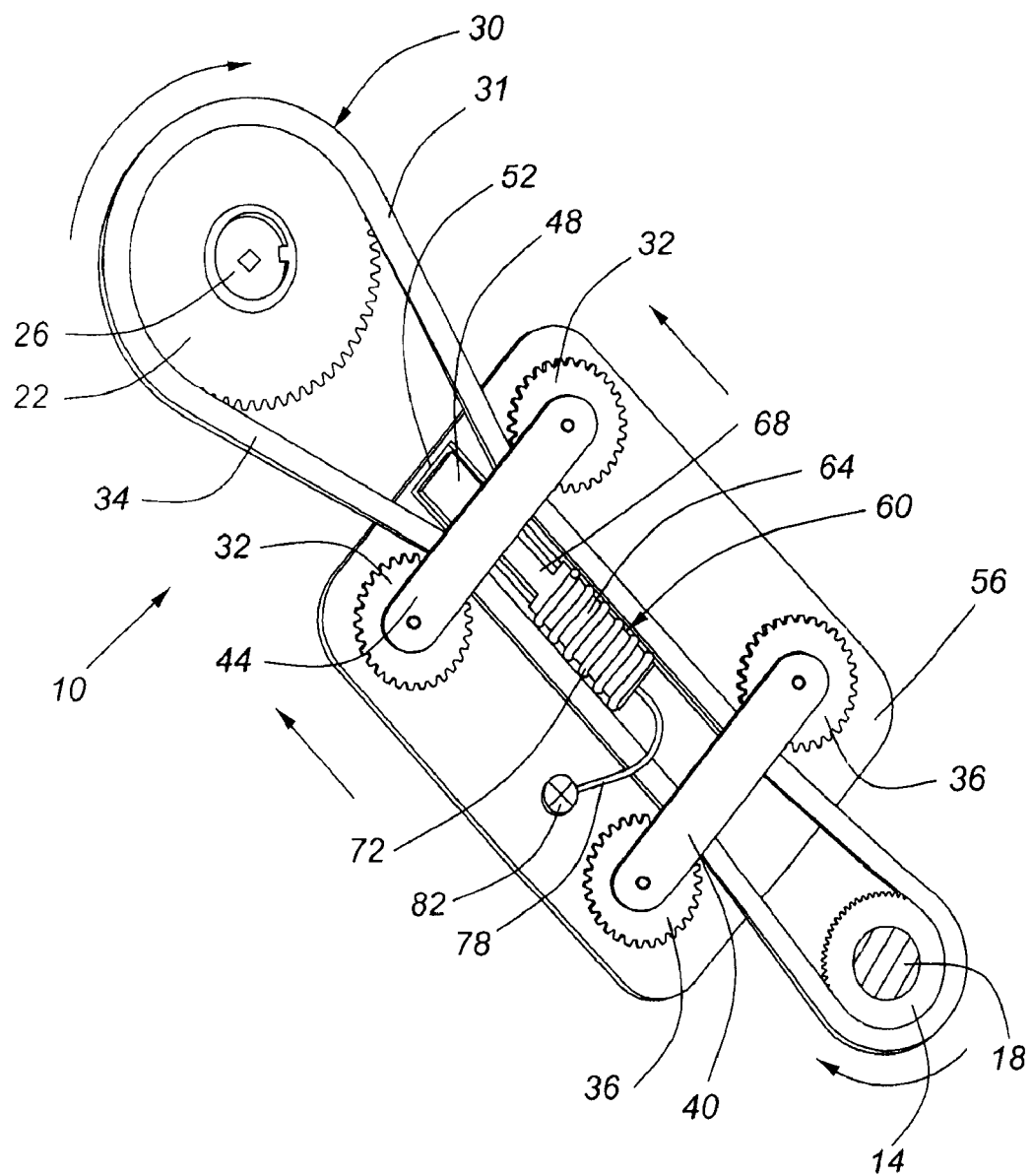
FIG. 1 is a perspective view of an engine having a camshaft drive system according to the present invention.

As shown in FIG. 1, engine 10 has crankshaft 18 with a drive sprocket, 14, attached thereto. Camshaft 26, having a camshaft sprocket, 22, attached thereto, is driven by means of flexible power transmission element 30, which has a tight side 31 and a slack side 34. Those skilled in the art will appreciate in view of this disclosure that flexible power transmission element 30 could comprise either a metallic link chain, or a metallic or non-metallic belt. The choice of a particular type of flexible power transmission element for use with the present invention is committed to those wishing to practice this invention.

FIG. 1 also shows two contactors, 32, which are depicted as two rollers. Those skilled in the art will further appreciate that contactors 32 could be smooth or toothed, and this is true regardless of whether flexible power transmission element 30 comprises either a chain or a belt.

Contactors 32 are attached to a movable bridge 44, which has a slider 48 fitted into channel 52 formed in plate 56, which is attached to an end portion of engine 10. Movable bridge 44, as well as contactors 32, is positioned by means of linear activator 60, which includes a plunger, 68, mounted for reciprocation within a cylinder, 64. Spring 72 is positioned within cylinder 64 so as to bias linear actuator 60, as well as movable bridge 44 and contactors 32, in a direction away from crankshaft 18 and towards camshaft 26. Thus it is seen that linear actuator 60 has an axis of operation which is parallel to a line extending from center of drive sprocket 14 to the center of cam sprocket 22. Further, in the embodiment of FIG. 1, linear actuator 60 has an axis of operation which is coincident with a line drawn between the center line of crankshaft 18 and the center line of camshaft 26.

The interior of cylinder 64 is filled with engine oil which is furnished under pressure from an engine lubrication system (not shown) through valve 82 and line 78. The oil forces plunger 68 upwards, so as to tension power transmission element 30. Stated another way, linear actuator 60 exerts a force which is in a direction tending to tighten flexible power transmission element 30 by pushing movable bridge 44 in the direction of camshaft 26 and cam sprocket 22. Because bridge 44 is mounted to plate 56 by means of slider 48 and channel 52, contactors 32 displace tight side 31 and slack side 34 of power transmission element 30 equally, preventing any camshaft phase change from occurring.

Force exerted by linear actuator 60 is equal to the sum of the spring force provided by spring 72 and hydraulic force exerted by lubricating oil upon plunger 68. Because check valve 82 is positioned in line 78, linear actuator 60 is prevented from retracting in response to the forces imposed by power transmission element 30 upon contactors 32. Those skilled in the art will appreciate in view of this disclosure that other types of linear actuators could be incorporated in the present camshaft drive system.

FIG. 1 also shows a fixed bridge 40, having two additional fixed contactors, 36, applied thereto. Bridge 40 and contactors 36 serve to bear upon tight side 31 and slack side 34 equally such that the travel of movable contactors 32 required to remove slack from both sides of power transmission element 30 is reduced.

Figure 2:
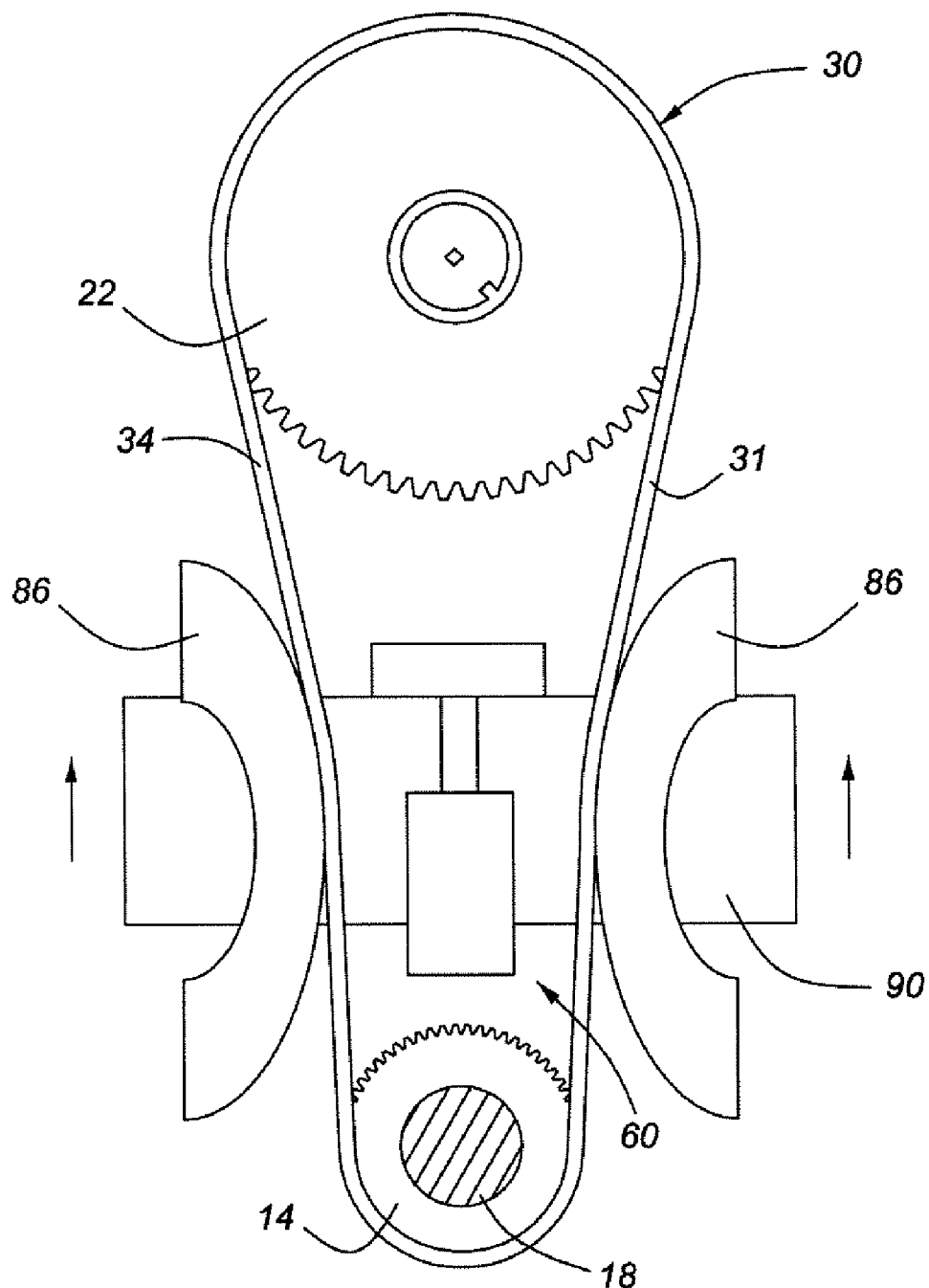
FIG. 2 is an embodiment of the present invention having slidable guide shoes for tensioning a power transmission element.

FIG. 2 illustrates a second embodiment in which bridge 90 has two guide shoes 86 attached thereto which are, once again, slidingly engaged with power transmission element 30 so as to tension both sides of power transmission element 30 without changing phasing between camshaft 26 and crankshaft 18. In essence, guide shoes 86 are sliders which guide power transmission element 30 without the need for the rotation present with contactors 32 illustrated in FIG. 1. As with the previous embodiment, linear actuator 60 provides the force required to tension power transmission element 30. Guide shoes 86 may be constructed of metallic, non-metallic, or composite materials known to those skilled in the art and suggested by this disclosure.

Figure 3:
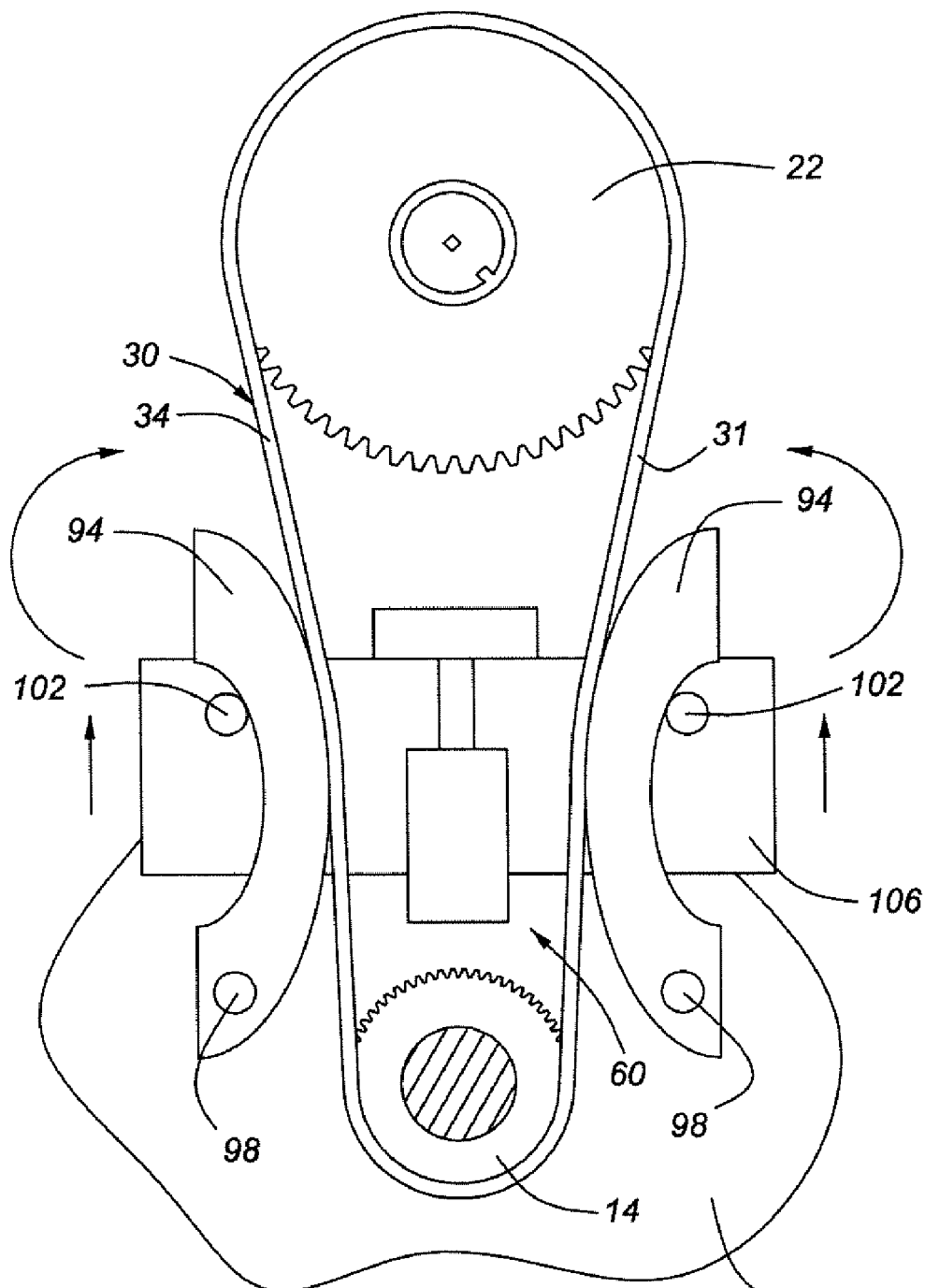
FIG. 3 is similar to FIG. 2, but shows a system having guide shoes which are pivoted.

FIG. 3 illustrates an additional embodiment in which guide shoes 94 are pivoted upon pivots 98 to front plate 56. In the embodiment shown in FIG. 3, guide shoes 94 are biased inwardly by the action of bridge 106 and guide pins 102, which are acted upon by linear actuator 60.

Figure 4:
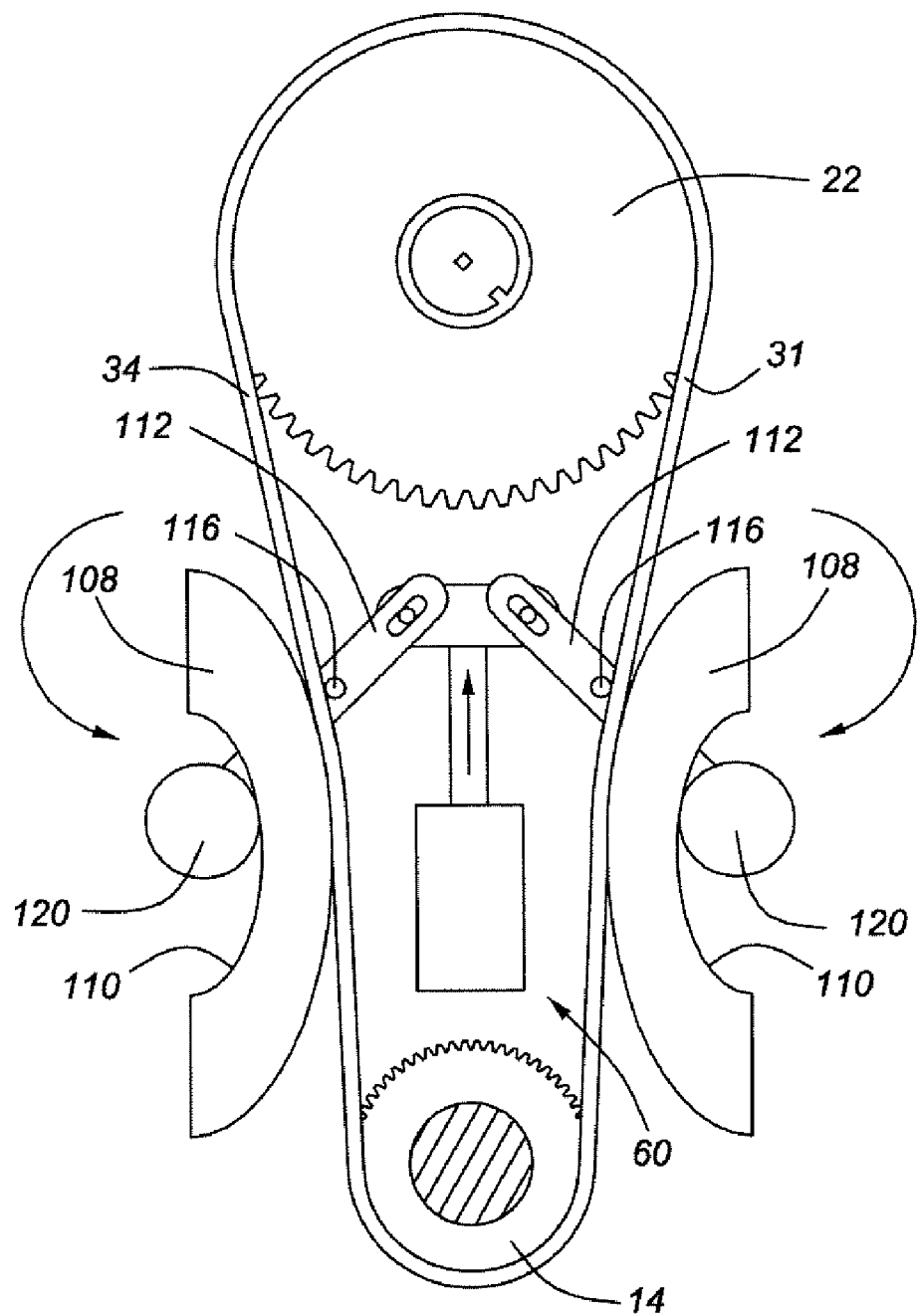
FIG. 4 is similar to FIGS. 2 and 3, but illustrates a system having guide shoes which are displaceable laterally.

In FIG. 4, guide shoes 108 have cutouts 110 which are engaged by contact pads 120, which are attached at the ends of fingers 112, which are pivoted upon pivots 116 such that linear actuator 60 causes guide shoes 108 to move laterally together by an equal amount to properly tension power transmission element 30 in response to movement of the linear actuator.

Figure 5:
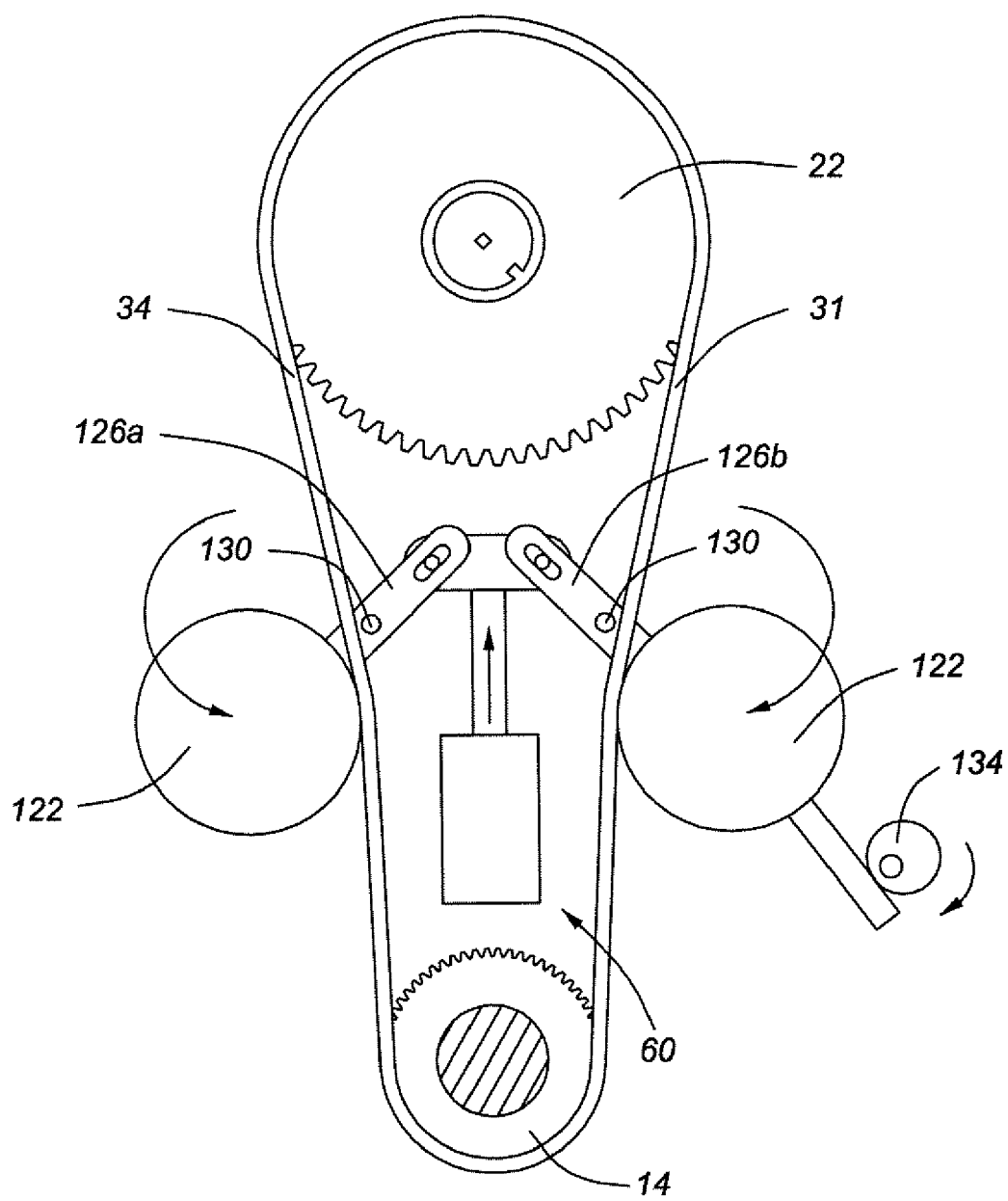
FIG. 5 is similar to FIG. 4, but shows a system according to the present invention having rotatable rollers employed as contactors for engaging and tensioning a flexible power transmission element.

FIG. 5 illustrates an embodiment which uses rollers 122, which are attached to fingers 126 pivoted upon pivots 130, with fingers 126 being rotated as before, by means of linear actuator 60. Eccentric lock 134 is provided to bear on an extension of one of fingers 126 so as to prevent back-driving of finger 126b in response to the forces acting upon tight side 31 of power transmission element 30.

While particular embodiments of the invention have been shown and described, numerous variations and alternate embodiments will occur to those skilled in the art. Accordingly, it is intended that the invention be limited only in terms of the appended claims.

What is claimed is:

1. A camshaft drive system for an internal combustion engine, comprising:
    a drive sprocket fixed upon a crankshaft of said engine;
    a driven sprocket fixed upon a camshaft of said engine;
    a flexible power transmission element extending between said drive sprocket and said driven sprocket, with said power transmission element having a slack side and a tight side; and
    a tensioning device for said flexible power transmission element, with said tensioning device comprising:
    a single linear actuator having an axis of operation which is parallel to a line extending from the center of said drive sprocket to the center of said driven sprocket;
    a plurality of movable contactors for engaging and thereby tensioning said slack side and said tight side of said flexible power transmission element, with each of said plurality of contactors being connected with, a single bridge, slidingly movable by said single linear actuator in the direction of movement of said single linear actuator such that movement of said single bridge and said single linear actuator in a selected direction along said axis of operation will cause said slack side and said tight side of said flexible power transmission element to be displaced equally; and
    a plurality of stationary contactors rigidly mounted adjacent to said flexible power transmission element, with at least one of said stationary contactors bearing upon said slack side of said power transmission element, and at least another one of said stationary contactors bearing upon said tight side of said power transmission element, such that the travel of said plurality of movable contactors needed to remove slack from said power transmission element is reduced.

2. A camshaft drive system according to claim 1, wherein said linear actuator comprises a spring-loaded plunger.

3. A camshaft drive system according to claim 1, wherein said linear actuator comprises a spring-loaded plunger slidably mounted within a cylinder furnished with a supply of oil under pressure from an engine lubrication system, such that the force exerted by said spring and said oil upon said plunger combine to urge said contactors in a direction tending to tighten said flexible power transmission element.

4. A camshaft drive system according to claim 3, wherein said oil is admitted into said cylinder through a check valve which prevents oil from leaving said cylinder.

5. A camshaft drive system according to claim 1, wherein said flexible power transmission element comprises a metallic chain.

6. A camshaft drive system according to claim 1, wherein said flexible power transmission element comprises a nonmetallic belt.

* * * * *